United States Patent [19]
Yates

[11] Patent Number: 6,019,425
[45] Date of Patent: Feb. 1, 2000

[54] BICYCLE SADDLE COVER

[76] Inventor: Paul M. Yates, 5814 Briar Tree Dr., LaCanada, Calif. 91011

[21] Appl. No.: 09/203,114

[22] Filed: Dec. 1, 1998

[51] Int. Cl.[7] .................................. B62J 1/20; B62J 1/22
[52] U.S. Cl. ....................................... 297/219.11; 297/202
[58] Field of Search ................................ 297/195.1, 202, 297/214, 219.11, 228.11, 228.13, 228.1

[56] References Cited

U.S. PATENT DOCUMENTS

| | | | |
|---|---|---|---|
| 572,163 | 12/1896 | Henderson | 297/202 X |
| 576,310 | 2/1897 | Henderson | 297/202 |
| 602,732 | 4/1898 | Craig | 297/202 X |
| 630,911 | 8/1899 | Moore | 297/202 |
| 1,991,751 | 2/1935 | Kennedy | 297/219.11 X |
| 4,844,539 | 7/1989 | Selbert | 297/228.13 |
| 5,340,352 | 8/1994 | Nakaishi et al. | 450/57 |

FOREIGN PATENT DOCUMENTS

| | | | |
|---|---|---|---|
| 163167 | 10/1933 | Switzerland | 297/219.11 |
| 94008839 | 4/1994 | WIPO | 297/219.11 |

*Primary Examiner*—Peter R. Brown
*Attorney, Agent, or Firm*—Walter A. Hackler

[57] ABSTRACT

A bicycle saddle cover includes a fabric/film enwrapment having a top, bottom and a perimeter with the perimeter being in the shape of a bicycle saddle. An elastomer molded to the enwrapment top creates at least one depression in the enwrapment top in order to accommodate a rider's anatomy and a tie cord disposed in the enwrapment body is provided for its cinching the cover around the bicycle seat.

16 Claims, 2 Drawing Sheets

BICYCLE SADDLE COVER

Conventional saddles or seats for bicycles and stationary exercise devices are typically formed of leather or plastic and are relatively hard and uncomfortable to the user, particularly during long rides or extended exercise.

Ordinarily, since such saddles or seats are generally mass produced items, the available seats and saddles do not provide comfort for many riders.

With regard to bicycles, especially off-road bicycles, sufficient shock absorption is not provided in the conventional seats or saddles. With regard to stationary exercise devices, the seat or saddle is uncomfortable for any length of time and can e painful due to chaffing after such extended use.

Heretofore, prior art devices have been made in order to provide softer padding for the bicycle saddle or seat surfaces and to reduce the discomfort by providing a better fit for the rider. While such prior pads may be a substantial improvement over the otherwise hard and unyielding saddle seats, such pads may be uncomfortable. In addition, because of the necessity for effectively upholstering an existing bicycle seat, heretofore bicycle pads and covers have been hand-tailored or sewn in order to provide adequate contouring to an existing bicycle seat, so that the original bicycle seat or saddle provides the structural support for the rider while the cover or pad provides the desired comfort.

The present invention provides for a bicycle saddle cover which enables a user to utilize an existing bicycle seat or saddle, while at the same time avoiding the costs of purchasing a new saddle. Accordingly, a bicycle saddle cover in accordance with the present invention, provides an economical saddle or seat cover having anatomical contours which provide comfort and a tailored fit heretofore only obtainable through a tailored sewn seat and saddle pads.

SUMMARY OF THE INVENTION

A bicycle saddle cover in accordance with the present invention generally includes a fabric/film enwrapment having a top, bottom and a perimeter with a perimeter being generally in the shape of a bicycle saddle. An elastomer molded to the enwrapment top provides a means for creating at least one depression in the enwrapment top in order to accommodate a rider's anatomy. In addition, a tie cord, disposed in the enwrapment bottom, provides means for cinching the cover around the bicycle seat.

The elastomer is bonded to the enwrapment for the purpose of contouring the enwrapment top with at least one depression in order to accommodate the rider's anatomy as hereinabove noted.

More particularly, the enwrapment top and the bottom may comprise different fabric/film materials in order to provide a suitable elastic enwrapment top for sitting thereon, while at the same time providing an enwrapment bottom having sufficient toughness and penetration resistance to cover any protruding portions which may be present on the bottom of a saddle without piercing or rupture of the enwrapment bottom.

Preferably, the elastomer top and bottom materials are heat sealed to one another in order to facilitate economical manufacture of the bicycle saddle cover.

More particularly, the at least one depression formed in the enwrapment top by the elastomer is provided in the horn portion of the enwrapment top. By forming the at least one depression in an arrowhead shape, relief for a male user of the bicycle seat is provided. A widening of the arrowhead shape towards a tail portion of the saddle cover accommodates the male anatomy.

In addition, in accordance with the present invention, an elongate depression is provided which separates the tail portion of the enwrapment top and preferably the elongate depression and the arrowhead depression are contiguous. The elongate depression facilitates and accommodates the rider's posterior and enables air circulation thereunder.

It must be appreciated that all of the depressions in the enwrapment top are formed therein and held by the underlying elastomer and accordingly no sewing, pleating or other manipulation of the fabric/film of the enwrapment top is required.

Preferably, the tie cord is disposed between two heat sealed encirclements of an edge of an opening disposed in the enwrapment bottom. This facilitates economical production of the bicycle saddle cover without the use of sewing and the like.

BRIEF DESCRIPTION OF THE DRAWINGS

The advantages and features of the present invention will appear from the following description when considered in conjunction with the accompanying drawings in which.

DETAILED DESCRIPTION

Figure 1:
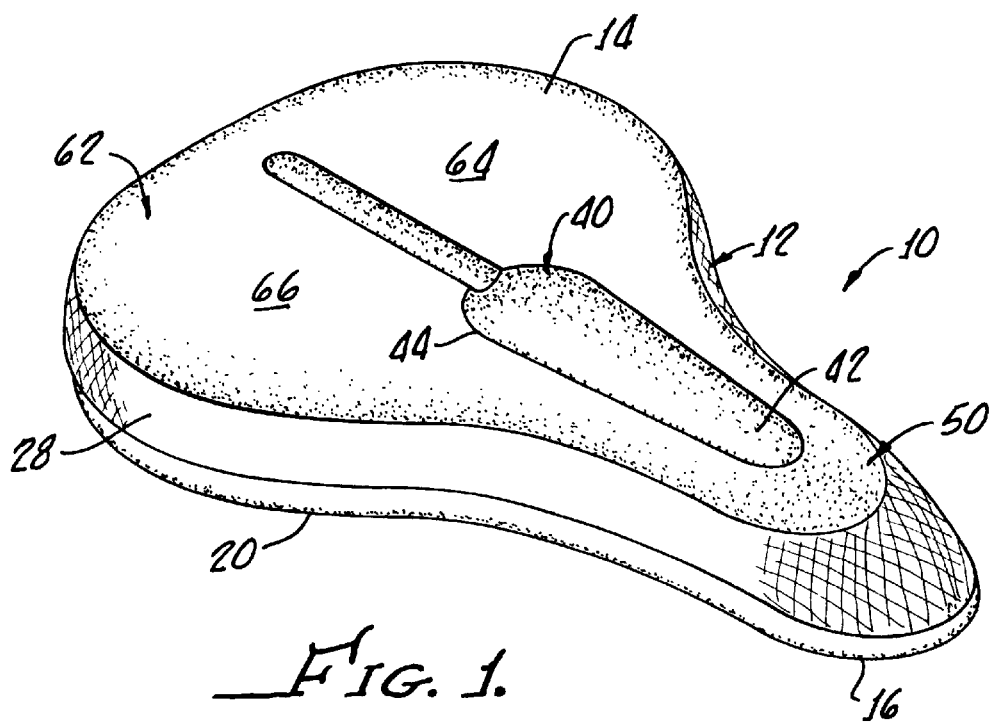
FIGS. 1 and 2 are perspective views of the bicycle saddle cover in accordance with the present invention generally showing an enwrapment top having at least one depression therein for accommodating a male rider's anatomy.
Figure 2:
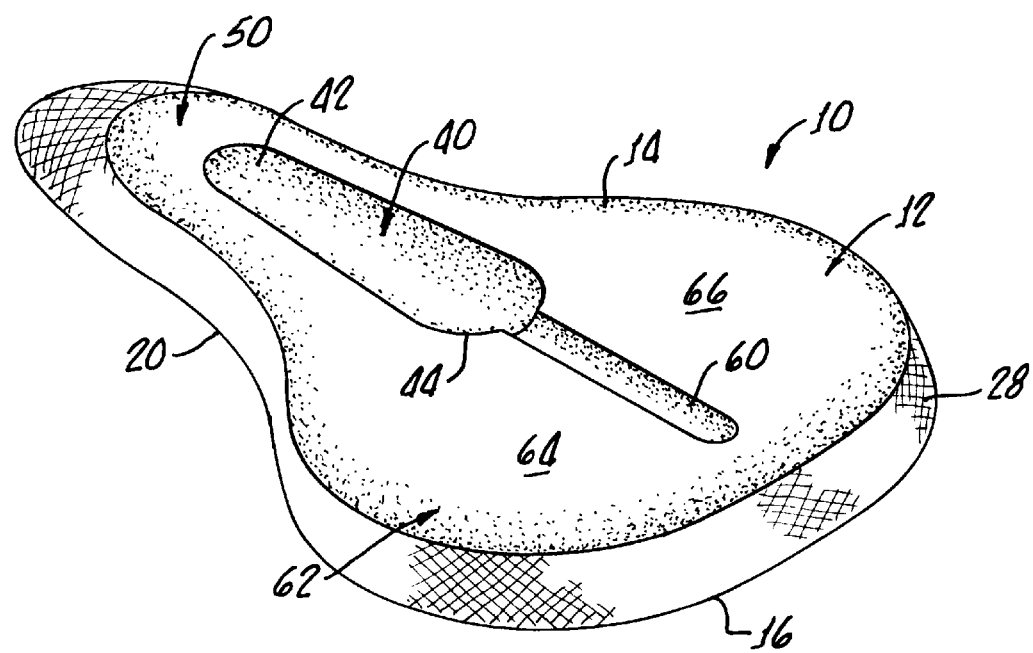

With reference now to FIGS. 1 and 2, there is shown a bicycle saddle cover 10 in accordance with the present invention which includes a fabric/film enwrapment 12 having a top 14, a bottom 16, and a perimeter 20 generally in the shape of a bicycle saddle (not shown).

The enwrapment top 14 may be any suitable fabric/film, however, preferably Lycra®, is utilized because of its two-way stretch characteristics.

Enwrapment bottom may be formed from any suitable urethane or polyethylene or other film having penetration resistance in order that any protruding fittings from a bicycle saddle (not shown) will not rupture or penetrate the enwrapment bottom. Suitable thicknesses of urethane are between about 0.001 inches and about 0.5 inches.

Preferably, the entrapment top and enwrapment bottom are heat sealed along the perimeter 20 and inverted to the configuration shown in FIGS. 1–4 suitable for enwrapping, or covering a bicycle saddle (not shown).

In addition, a thin plastic film 28 may be heat sealed to the entrapment top 14 in order to provide scuff pads encircling the cover 10.

It should be appreciated that all of the manufacturing steps utilized for producing the present invention are disclosed in companion U.S. patent application Ser. No. 09/137,602 filed Aug. 21, 1998, entitled, BICYCLE SADDLE COVER PAD AND METHOD OF MANUFACTURE. This patent application is to be incorporated herein in its entirety, including all drawings and specification, for the purpose of describing the method of manufacturing the bicycle saddle shown in FIGS. 1–4 and described herein.

Figure 4:
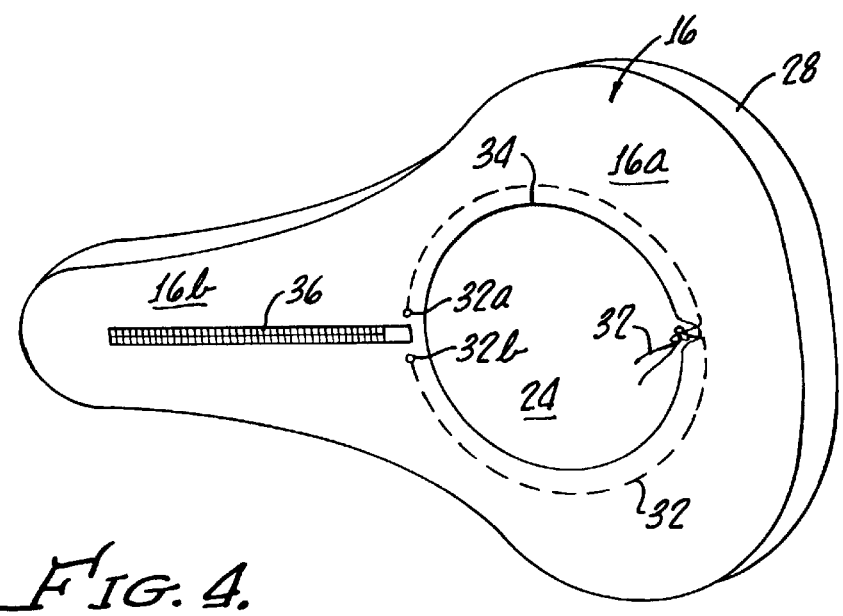
FIG. 4 is a perspective view of a bottom of the bicycle saddle cover shown in FIGS. 1, 2 and 3 generally showing an enwrapment body, an opening and an encircling tie cord for cinching the cover around the bicycle seat (not shown).

As shown in FIG. 4, a tie cord 32 may be heat sealed in an entrapment bottom tail portion 16a, about an opening 34 in the enwrapment bottom 16 for cinching the cover 10 around the bicycle seat (not shown). A method of incorporating the tie cord is also described in the hereinabove referenced U.S. patent application which is further to be incorporated herein in its entirety for describing the method of making the present invention which includes the elastomer 24 and tie cord 32.

In addition, a zipper 36 may be provided in an enwrapment bottom horn portion 16b in order to facilitate covering a saddle (not shown) with the enwrapment 12. Preferably, the zipper 36 and tie cord 32 are contiguous which enables opening of the zipper and spreading of the opening 24 as well as the bottom horn portion 16b. This feature is enabled by fixing the tie cord at points 32a, 32b on either side of the zipper 36.

The elastomer 24 is molded onto the enwrapment top, as described in the hereinabove referenced U.S. patent application Ser. No. 09/137,602, for creating a depression 40 in the enwrapment top 14.

Figure 3:
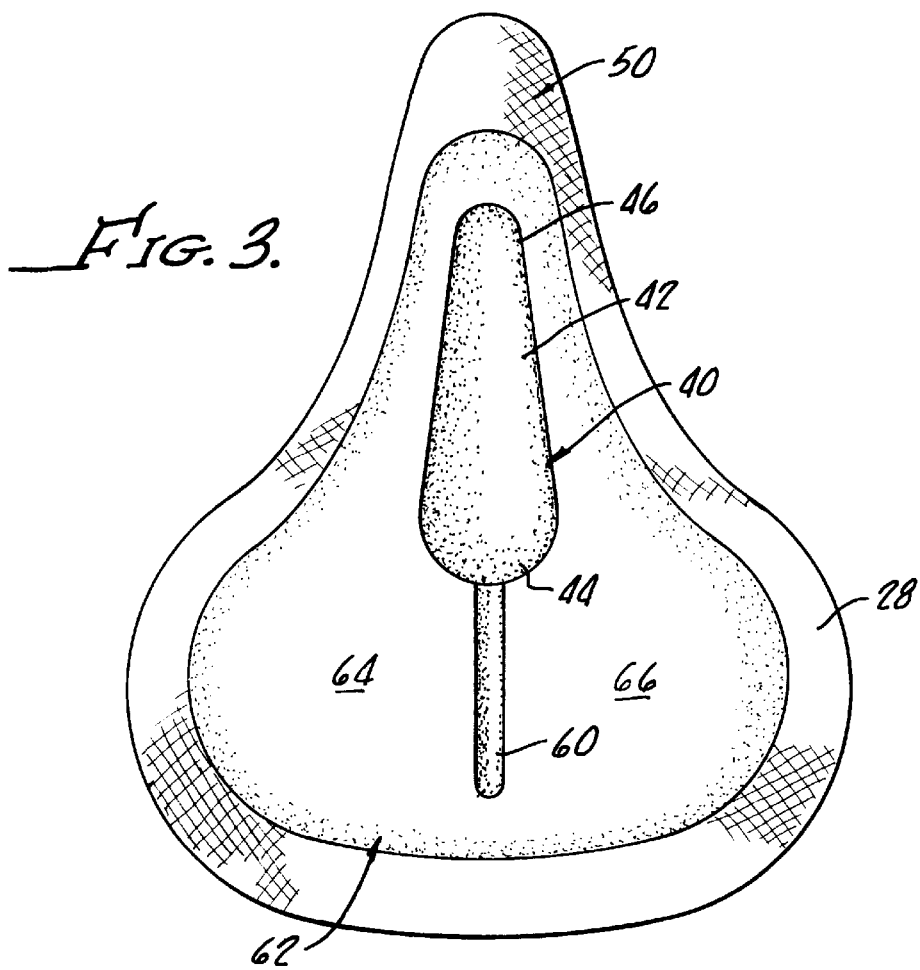
FIG. 3 is a top plan view of the saddle cover shown in FIGS. 2 and 3.

Preferably, a forward portion 42 of the depression 40 is in the shape of an arrowhead, as most clearly shown in FIG. 3, in order to accommodate the anatomy of a male rider.

The forward depression portion 42 is deeper, for example, up to one-half inch, toward a rear end 44 thereof and shallower at a front end 46. All of the arrowhead depression 42 may be disposed generally within a horn portion 50 of the saddle cover 10.

In addition, an elongate depression 60 is preferably formed in the enwrapment top 14 which separates a tail portion 62 of the saddle cover 10 into opposing sides 64, 66. The elongate depression enables better accommodation of a rider's buttock (not shown), while allowing independent movement thereof and providing a passageway for air movement under the rider in order to create a breathing type circulation pattern for cooling purposes. The elongate depression 60 may be from between about 0.25 inches and about 0.5 inches.

Additionally, the arrowhead depression 40 and elongate depression 60 are preferably contiguous, which enables easy folding of the two tail portions 64, 66 toward one another when stretched in placement over a bicycle saddle (not shown).

Although there has been hereinabove described a bicycle saddle cover for the purpose of illustrating the manner in which the invention may be used to advantage, it should be appreciated that the invention is not limited thereto. Accordingly, any and all modifications, variations and equivalent arrangements which may occur to those skilled in the art, should be considered to be within the scope of the invention as defined in the appended claims.

What is claimed is:

1. A bicycle saddle cover comprising:
   a fabric/film enwrapment having a top, bottom and a perimeter, said perimeter being in the shape of a bicycle saddle, with a horn portion and a tail portion;
   an elastomer molded onto the enwrapment top; and
   means, disposed in the enwrapment bottom, for cinching the cover around a bicycle seat, the means for cinching comprising a tie cord disposed in the tail portion of the enwrapment, a zipper disposed in the horn portion of the enwrapment, said tie cord and zipper being contiguous.

2. The bicycle saddle cover according to claim 1 wherein the enwrapment top and bottom comprise different fabric/film materials.

3. The bicycle saddle cover according to claim 2 wherein the enwrapment top and bottom are heat sealed to one another.

4. The bicycle saddle cover according to claim 1 further comprising at least one depression formed in the elastomer and horn portion of the enwrapment top.

5. The bicycle saddle cover according to claim 4 wherein the at least one depression has a relatively narrow front end and a relatively wide rear end, the one depression being deeper at the rear end than at the front end.

6. The bicycle saddle cover according to claim 5 further comprising an elongate depression separating a tail portion of the enwrapment top.

7. The bicycle saddle cover according to claim 6 wherein the elongate depression and the one depression are contiguous.

8. A bicycle saddle cover comprising:
   a fabric/film enwrapment having a top, bottom and a perimeter, said perimeter being in the shape of a bicycle saddle:
   elastomer means, molded onto the enwrapment top, for creating at least one depression in a horn portion of the enwrapment top and an elongate depression separating a tail portion of the enwrapment top in order to accommodate a rider's anatomy, the one depression and the elongated depression being contiguous; and
   means, disposed in the enwrapment bottom, for cinching the cover around a bicycle seat, the means for cinching comprising a tie cord disposed in the tail portion of the enwrapment means and a zipper disposed in the horn portion of the enwrapment bottom, said tie cord and zipper being contiguous.

9. The bicycle saddle cover according to claim 8 wherein the enwrapment top and bottom comprise different fabric/film materials.

10. The bicycle saddle cover according to claim 9 wherein the entrapment top and bottom are heat sealed to one another.

11. A bicycle saddle cover comprising:
    a fabric/film enwrapment having a top, bottom and a perimeter, said perimeter being in the shape of a bicycle saddle;
    elastomer means for contouring the enwrapment top with at least one depression in order to accommodate a rider's anatomy; and
    means, disposed in the enwrapment bottom, for cinching the cover around a bicycle saddle, said means for cinching comprising a tie disposed in a tail portion of the enwrapment bottom and a zipper disposed in a horn portion of the enwrapment bottom, said tie cord and zipper being contiguous.

12. The bicycle saddle cover according to claim 11 wherein the at least one depression is formed in a horn portion of the enwrapment.

13. The bicycle saddle cover according to claim 12 wherein said elastomer means is interlocked with the enwrapment by molding said elastomer means thereagainst.

14. The bicycle saddle covering according to claim 13 wherein the at lest one depression has a relatively narrow front end and a relatively wide rear end, the one depression being deeper at the rear end than at the front end.

15. The bicycle saddle cover according to claim 14 further comprising an elongate depression separating a tail portion of the entrapment top.

16. The bicycle saddle covering according to claim 14 wherein the elongate depression and the one depression are contiguous.

* * * * *